J. J. BUKOLT.
TIRE ARMOR.
APPLICATION FILED NOV. 13, 1913.
1,118,264.
Patented Nov. 24, 1914.
2 SHEETS—SHEET 2.
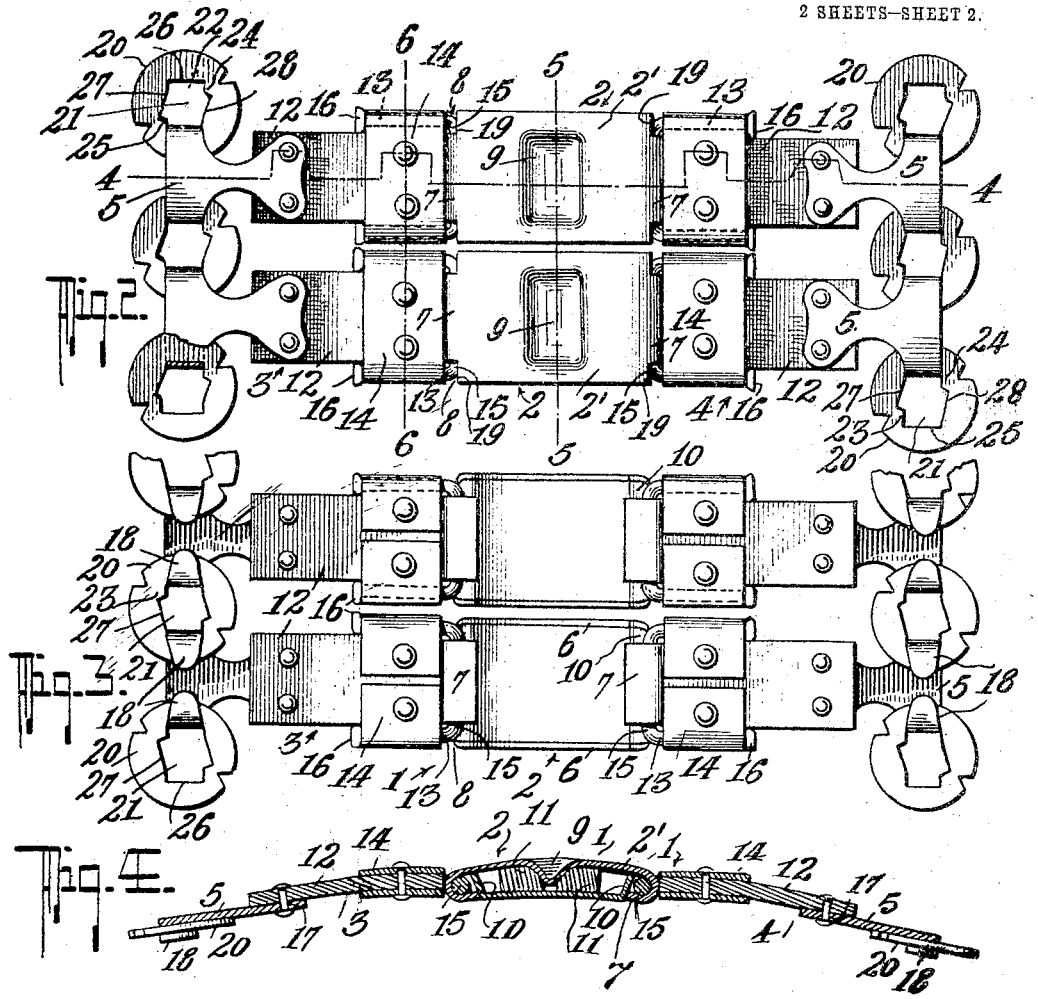
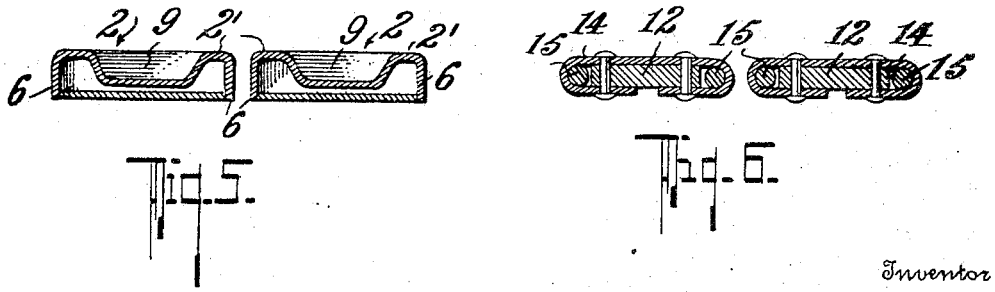
Witnesses
H. Woodard
Inventor
John J. Bukolt
By H. R. Willson & Co.
Attorney

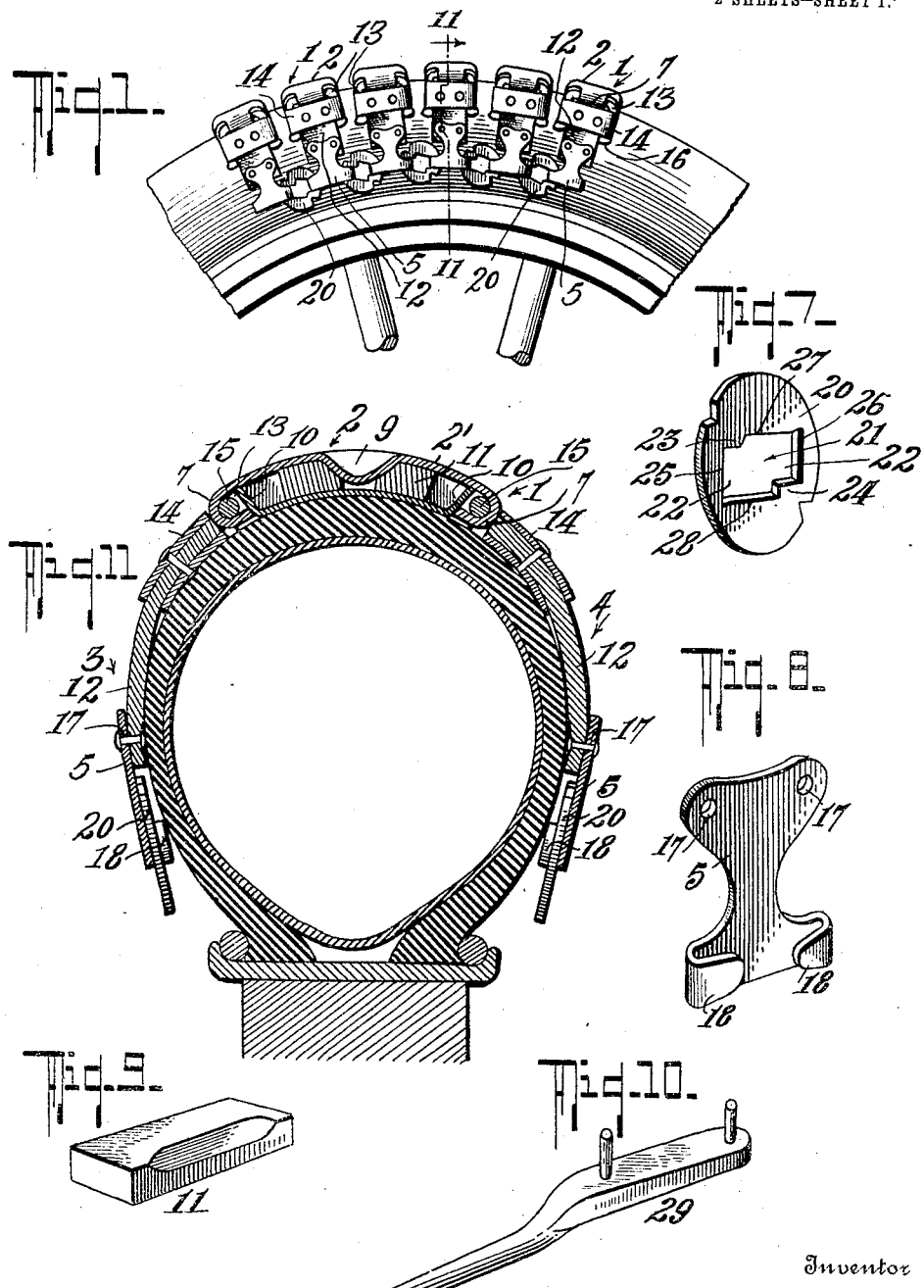

UNITED STATES PATENT OFFICE.

JOHN J. BUKOLT, OF STEVENS POINT, WISCONSIN.

TIRE-ARMOR.

1,118,264.  Specification of Letters Patent.  Patented Nov. 24, 1914.

Application filed November 13, 1913. Serial No. 800,880.

*To all whom it may concern:*

Be it known that I, JOHN J. BUKOLT, a citizen of the United States, residing at Stevens Point, in the county of Portage and State of Wisconsin, have invented certain new and useful Improvements in Tire-Armors; and I do declare the following to be a full, clear, and exact description of the invention, such as will enable others skilled in the art to which it appertains to make and use the same.

This invention relates to improvements in tire armors or protectors.

The object of the invention is to provide a tire armor which will efficiently operate to prevent the tire from destructive abrasion, from puncture, and from skidding.

Another object of the invention is to provide a tire armor which may be quickly adjusted and easily repaired should one of the sections become worn or loosened.

With these and other objects in view, the invention consists of certain novel features of construction, and the combination and arrangement of parts, as will be more fully described and claimed.

In the accompanying drawings:—Figure 1 is a side elevation of a portion of an automobile wheel equipped with this improved armor. Fig. 2 is a top plan view of a portion of the armor. Fig. 3 is a bottom plan view thereof. Fig. 4 is a central longitudinal section through one section of the armor. Fig. 5 is a transverse section taken on line 5—5 of Fig. 2. Fig. 6 is a transverse section taken on the line 6—6 of Fig. 2. Fig. 7 is a perspective view of one of the section connecting elements or chain links. Fig. 8 is a similar view of one of the terminal members of each section and which are connected by the links. Fig. 9 is a perspective view of one of the wooden blocks housed in the tread members. Fig. 10 is a perspective view of the key or wrench employed for actuating the link. Fig. 11 is a transverse section of a tire equipped with this improved armor.

In the embodiment illustrated, the armor is constructed of a plurality of sections 1 adapted to extend transversely of a tire and which are detachably connected at their terminals in a manner hereinafter described. Each section 1 comprises a tread member 2 and substantially flexible side members 3 and 4 movably connected at one end with said tread member at its opposite ends, and said side members are provided at their free ends with link engaging members 5. Each tread member 2 comprises a substantially rectangular longitudinally bowed metal plate 2' having its side edges bent inwardly at right angles to form flanges 6 and its ends bent to form hooks 7 with which latter the side members 3 and 4 are designed to be engaged, as will be hereinafter described. The bent hooked portions 7 of each plate 2' are cut away at their inner ends as shown at 8 to provide for the insertion and free movement of the connecting pintles of the side members. Each of these plates 2' has an instruck portion 9 forming anti-skidding elements, which is arranged mid-way between the ends of said plate and which is spaced from the side flanges of said plate for a purpose to be described.

The inner member or wall of each tread member 2 is constructed in the form of a rectangular plate of a width slightly less than the width between the side flanges of the plate 2' to adapt it to fit between said flanges and which has its opposite ends bent inwardly to form right angular flanges 10. This inner tread plate 9, after the ends have been bent to form the flanges 10, is of a length slightly less than the distance between the inner edges of the hooks 7 of the plate 2' and said plate is designed to fit between said hooks with the flanges 10 thereof resting against the inner face of the plate 2'. When this plate is manufactured, it is bowed slightly, and after it has been disposed in the plate 2' between its hooked ends, sufficient force is brought to bear on the outer face thereof to force it inwardly and so curve it as to adapt it to fit the outer face of a pneumatic vehicle tire. When pressure is exerted on this plate to force it inwardly, the flanged ends 10 thereof will spread outwardly under the hooks 7, thereby securely locking said plate 9 in engagement with the plate 2', as is shown clearly in Figs. 4 and 11. Before the plate 9 is secured in position, wooden blocks 11 are preferably disposed in the plate 2' on opposite sides of the inbent portion or skidding element thereof, and are designed to form fillers or cushioning members between the plates 2' and 9, and which also serve as spacers to hold the plates the desired distance apart with the outer face of plate 9 flush with the free edges of the flanges 6 of plate 2'. This plate 9, after it has been placed in operative position, has the same curvature as the flanges 6, thereby presenting a smooth surface for contact with the tire to prevent all danger of abrasion. It is to be understood that before these plates 9 are forced into locking engagement with the hooks 7, the side members 3 and 4 will have first been engaged with said hooks 7.

The side members 3 and 4 are exactly alike, and hence only one will be described in detail. Each side member is composed of a piece of flexible material 12 preferably of balata belting to one end of which is secured a pintle 13 for movable engagement with the hooks 7 of the tread members. These pintles are shown constructed of heavy wire bent into substantially U-shape with the legs thereof arranged on opposite sides of one end of the belting 12 and clamped thereto by means of a plate or split loop 14, which extends around the legs of the pintle and the end of the belting and is secured to the latter by rivets or other suitable fastenings. The cross bar 15 of the U-shaped pintle projects beyond the outer edge of the clamping plate 14 a sufficient distance to permit the insertion of the pintle in the hooks 7, the distance between the inner face of the cross bar and the outer edge of the clamping plate being slightly greater than the thickness of the hooks 7 to permit said pintles to turn in said hooks without lost motion or without being loose enough to cause wear at the point of connection. The ends of the legs of the pintle 14 are preferably headed as shown at 16 to prevent them from slipping through the plate 14. The link engaging member 5 is secured to the other end of the belting 12 by riveting or otherwise and said members are preferably constructed as shown in detail in Fig. 8. These link engaging members 5 are made in the form of heavy metal plates centrally reduced in width to lighten them, and one end of which is apertured as shown at 17 to provide for its connection with the belting 12 and the other end thereof has inturned oppositely disposed hooks 18 on its opposite side edges which are adapted to receive section connecting links 20 now to be described.

The ends of adjacent sections 1 are connected by suitable links 20 which are engaged with the hooks 18 of the link engaging elements 5. These links are constructed as shown in detail in Fig. 7 in the form of disks, each having a central aperture 21, and the periphery of which is provided with diametrically disposed notches 22. The aperture 21 of each disk is substantially in the form of a rhomboid with projections 23 and 24 extending inwardly from the remote corners thereof and in alinement with the notches 22. By forming these projections 23 and 24 at the remote corners of the rhomboidal aperture, the side walls of said recess are of exactly the same length, but the distance between the walls 25 and 26 is greater than that between the walls 27 and 28. These walls 25, 26, 27, and 28 are substantially of the same length as the width of the hooks 18 of the members 5, so that when said hooks are engaged with said links, they are held against accidental lateral movement. Consequently, it will be seen that when the hooks of adjacent sections are engaged with the walls 25 and 26 of a connecting link 20, said sections will be disposed a greater distance apart than when said hooks are engaged with the walls 27 and 28 which are those on opposite sides of the rhomboidal opening, the walls 25 and 26 being at the opposite ends thereof.

The notches 22 are designed to be engaged by a suitable wrench 29 shown in detail in Fig. 10, which is designed for turning the links 20 to bring the armor sections closer together or to space them farther apart from each other as may be desired. When it is desired to bring the sections closer together, the link is shifted a quarter turn, which will cause the hooks of adjacent sections to engage the walls 27 and 28 at opposite sides of the rhomboidal aperture and when it is desired to space said sections farther apart, the link is given another quarter turn which will engage the hooks of adjacent sections with the walls 25 and 26 at the opposite ends of the aperture 21.

By cutting off the opposite ends of the flanges 6 stops 19 are formed at the opposite ends of the bearings formed by the hooks 7 and with which the pintles 13 of the side members engage. These stops 19 limit the swinging movement of said side members in one direction, their movement in the opposite direction being limited by the engagement of one edge of each clamping plate 14 with a hook 7.

In the application of this improved armor, a suitable number of sections 1 to encircle a tire of predetermined size are disposed side by side with their tread plates in alinement and the members 5 at the opposite ends thereof are connected by the links 20. Before this armor is applied to the tire, the tire is inflated, and after the armor has been arranged thereon, it is tightened into operative position by turning or tightening up the links 20 on each side until the desired fit is obtained. After the armor has been used for a considerable length of time and the parts thereof have become worn or loosened, more links may be tightened until the proper tension is obtained, and when the armor becomes so worn that all of the links have been tightened to their utmost, they may be loosened and one section of the armor taken out and the adjacent sections connected again, and the links tightened up whereby the proper fit of the armor will be insured.

I claim as my invention:—

A tire armor composed of a plurality of separable sections each including a puncture proof tread member comprising an outer plate having side flanges and turned end hooks with spaces between the ends of said hooks and said flanges, an inner plate shaped to fit between the flanges and hooks of the outer plate and having inturned end flanges for extension under said hooks, the flanges of said outer plate and the inner plate being curved longitudinally to conform to the transverse curvature of a tire and extending flush with each other, and side members flexibly connected with said tread member.

In testimony whereof I have hereunto set my hand in presence of two subscribing witnesses.

JOHN J. BUKOLT.

Witnesses:
 JOHN G. GLINSKI,
 WM. J. EIDEN.